United States Patent Office 2,835,862
Patented May 20, 1958

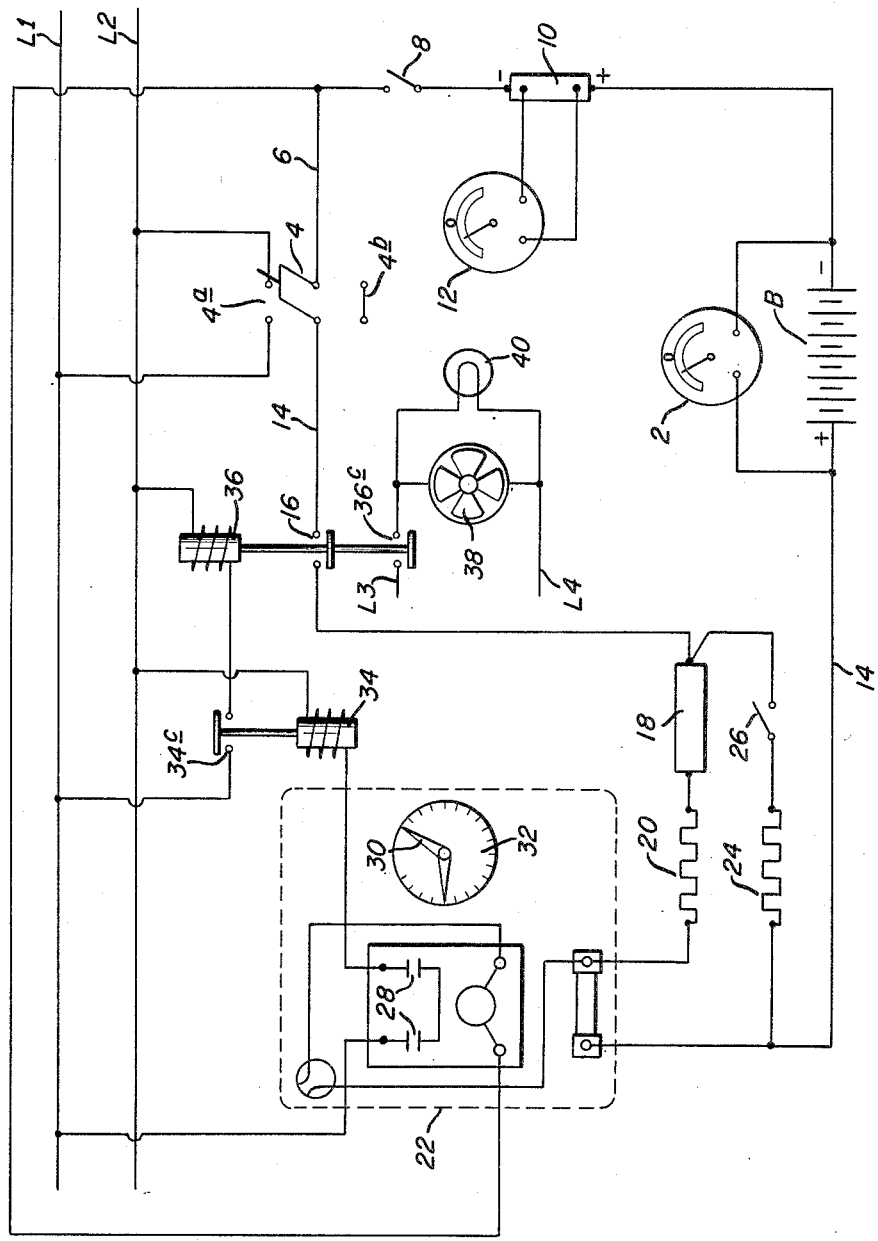

2,835,862

APPARATUS FOR CHARGING AND TESTING BATTERIES

John W. McNutt, Dravosburg, Pa., assignor to United States Steel Corporation, a corporation of New Jersey Application November 23, 1955, Serial No. 548,634

3 Claims. (Cl. 320—14)

This invention relates to apparatus for charging and testing multiple cell batteries, particularly those batteries of the heavy duty industrial lead-acid type which are employed to operate fork lift tractors and like equipment.

It is common practice during the life of such batteries to perform certain tests to determine the condition of the individual battery cells. One test which may be used consists of charging the battery to its nominally rated ampere-hour capacity and subsequently discharging the battery under controlled load conditions for a definite period of time. By maintaining a continual check on the individual cell voltages, total battery voltage, and ampere-hours of dissipated energy, the operating characteristics of the battery and individual cells may be obtained. This information is of particular interest as the age of a battery increases and sulphating of the lead cell plates takes place.

When fully charged, individual cells of a lead-acid battery are capable of producing approximately 2.00 volts. As the battery is discharged, complex chemical reactions take place within the cells between the lead plates and sulphuric acid electrolyte which both reduces the acid concentration of the electrolyte and produces a sulphate compound on the cell plates. Throughout the discharge operation, the voltage attainable from an individual cell is reduced, and, when the cell voltage reaches a nominal cut-off voltage of 1.75 volts, the cell is considered discharged. Charging the cell reverses the previous chemical reactions and restores the acid concentration of the electrolyte and increases the cell voltage to the original value of approximately 2.00 volts. It is not possible to fully remove all the sulphate from the cell plates during normal battery charging operations, accordingly, over a period of time, the accumulation of unremoved sulphate becomes crystalline in form. The formation of crystalline sulphate reduces the usable area of the cell plates and thereby causes the sulphated cells to reach a discharged condition much sooner than normal when placed under load. By employing special charging practices, wherein the cells are discharged to approximately 1.00 volt and recharging is accomplished at a much slower rate than normal, additional sulphate is removed from the cell plates as compared to normal charging operations, and further satisfactory use of the cell may be obtained.

Prior to my invention it was necessary to use one set of equipment for charging the battery and another set of equipment for discharging it. The discharger was not readily adapted for different discharge rates.

It is therefore an object of my invention to provide apparatus for testing batteries that can both discharge and charge the battery at various rates.

This and other objects will be more apparent after referring to the following specification and attached drawings, in which:

The single figure is a schematic wiring diagram incorporating my invention.

Referring more particularly to the drawing, reference character B indicates the battery to be charged and tested. Power for charging the battery B is received from a variable D. C. power source L1—L2. A voltmeter 2 of the center zero type is mounted across the terminals of battery B. A double pole-double throw switch 4 is mounted across the leads L1—L2. A lead 6 connects one side of switch 4 to the negative side of battery B through switch 8 and shunt 10. An ammeter 12 of the center zero type is connected across shunt 10. A lead 14 connects the other side of switch 4 to the positive side of battery B through contact 16, carbon pile rheostat 18, fixed resistor 20 and ampere hour meter 22 connected in series. The carbon pile rheostat enables fine adjustment of the resistance in the circuit. A fixed resistor 24 and switch 26 are connected in parallel with carbon pile rheostat 18, fixed resistor 20 and ampere hour meter 22. The ampere hour meter 22 is a standard type and may be the type N2F shown in Sangamo Electric Company's Bulletin 630—Issue 1. The meter 22 has normally open contacts 28 which will close when its pointer 30 leaves the zero position on scale 32. The contacts 28 are connected to power source L1—L2 through a relay coil 34 which has a normally open contact 34C. Contact 34C is connected in series with relay coil 36 which operates contact 16. If desired relay coil 36 may also be connected to operate a normally open contact 36C. The contact 36C is connected in circuit with a fan motor 38 and light 40 which are supplied with power from an A. C. power source L3—L4.

The operation of my device is as follows:

The switch 4 is moved to position 4a to complete a circuit to lines L1—L2 and switch 8 is closed. Assuming that battery B is an 18 cell, 500 ampere-hour battery and that a current of 22.5 amperes per 100 ampere-hours of battery capacity is to be passed through the battery at a charging voltage equal to the number of cells times 2.63 volts until 85% of the charge is reached, the switch 26 will be closed and pointer 30 moved to indicate 500 ampere hours. This closes contacts 28, thus energizing coil 34 and closing contact 34C. This in turn energizes relay coil 36 closing contacts 16 and 36C. Closing of contact 36C completes a circuit to fan motor 38 directing cooling air on the resistors 18, 20 and 24 so that stable resistance values are maintained over extended periods of operation. Closing of contact 36C also completes a circuit to a light 40 so that the operator will know that the device is in operation. Closing of contact 16 starts charging of the battery. The carbon pile rheostat 18 is adjusted to obtain a current flow of 112.5 amperes as indicated by ammeter 12. The voltage of power source L1—L2 is adjusted to 18×2.63 or 47.34 volts as indicated on meter 2. When approximately 85% of the charge is completed indicator 30 will be approximately at the "75" mark and the charging rate is then reduced to 25 amperes by opening switch 26 and adjusting carbon pile rheostat 18. When indicator 30 reaches the zero position it causes contacts 28 to open, thus opening contacts 16 and 36C. Opening of contact 16 stops the battery charging action and opening of contact 36C causes fan 38 to stop and light 40 to go out.

For a battery discharge test, switch 4 is moved to position 4b, switch 8 is closed and pointer 30 moved slightly from its zero position so as to close contacts 28 which in turn causes contacts 16 and 36C to close. The standard six hour discharge rate should produce 83.3 amperes for six hours so that rheostat 18 is adjusted until 83.3 amperes appears on ammeter 12. For faster discharge rates switch 26 will be closed. The rheostat 18 will be adjusted from time to time throughout the test to maintain this discharge rate and the various cell voltages and total battery voltages will be determined. When the voltage on meter 2 reaches 18×1.75 volts or 31.5 volts, this being the cut-off voltage, the indicator 30 is moved to zero to open the circuit from battery B. A comparison between the elapsed time required for individual cells to reach the cut-off voltage of 1.75 volts and the theoretical time as determined by the discharge rate indicates the condition of individual cells. Likewise, a comparison of the actual discharge time of the battery with the theoretical time detremined by the discharge rate indicates the available capacity which a battery can dissipate.

Unsatisfactory cells which are found by the foregoing discharge test must be specially charged according to the slow-charging procedure previously mentioned. This slow-charging operation may also be accomplished on the battery testing apparatus in a similar manner to that described for normal charging, but adjustments must be made to obtain the correct values of charging voltage and current as determined by the number of cells to be slow-charged, and electrical leads to the battery must be rearranged.

While one embodiment of my invention has been shown and described it will be apparent that other adaptations and modifications may be made without departing from the scope of the following claims.

I claim:

1. Apparatus for charging and testing a battery comprising a variable rheostat, an ampere hour meter and a normally open contact connected in series, a circuit including a relay coil for operating said contact, said ampere hour meter including means for energizing said circuit to close said contact when said meter is out of zero position, means for completing a circuit from said battery through said variable rheostat, ampere hour meter and said normally open contact to discharge said battery, and means for connecting said battery, variable rheostat, ampere hour meter and said normally open contact to a D. C. power source to charge said battery.

2. Apparatus for charging and testing a battery comprising a variable carbon pile rheostat, an ampere hour meter, a double pole-double throw switch and a normally open contact connected in series, a circuit including a relay coil for operating said contact, said ampere hour meter including means for energizing said circuit to close said contact when said meter is out of zero position, said double pole-double throw switch being movable to complete a circuit from said battery through said variable rheostat, ampere hour meter and said normally open contact to discharge said battery, said double pole-double throw switch being movable to connect said battery, variable rheostat, ampere hour meter and said normally open contact to a D. C. power source to charge said battery.

3. Apparatus for charging and testing a battery according to claim 2 including a first resistor connected in series with said carbon pile rheostat and said ampere hour meter and a second resistor and switch connected in parallel with said first resistor, carbon pile rheostat and ampere hour meter.

References Cited in the file of this patent

UNITED STATES PATENTS

| | | |
|---|---|---|
| 1,313,019 | Schmitz | Aug. 12, 1919 |
| 1,823,780 | Benner | Sept. 15, 1931 |